United States Patent
Roddy

(10) Patent No.: US 7,086,466 B2
(45) Date of Patent: Aug. 8, 2006

(54) USE OF SUBSTANTIALLY HYDRATED CEMENT PARTICULATES IN DRILLING AND SUBTERRANEAN APPLICATIONS

(75) Inventor: Craig W. Roddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 227 days.

(21) Appl. No.: 10/775,348

(22) Filed: Feb. 10, 2004

(65) Prior Publication Data

US 2005/0173117 A1    Aug. 11, 2005

(51) Int. Cl.
*E21B 33/13*    (2006.01)
*E21B 43/267*   (2006.01)

(52) U.S. Cl. ............... 166/280.1; 106/819; 166/280.2; 166/292; 166/293; 175/72; 507/141; 507/269; 507/904

(58) Field of Classification Search ............. 166/280.1, 166/280.2, 292, 293; 175/72; 507/140, 507/269, 904; 106/819
See application file for complete search history.

(56) References Cited

U.S. PATENT DOCUMENTS

| | | | |
|---|---|---|---|
| 2,857,286 A | 10/1958 | Striker | |
| 3,366,177 A * | 1/1968 | Powers et al. ............... | 166/276 |
| 3,607,326 A | 9/1971 | Serafin | |
| 3,958,638 A | 5/1976 | Johnston ..................... | 166/294 |
| 4,142,910 A | 3/1979 | Kraemer et al. | |
| 4,202,795 A | 5/1980 | Burnham et al. ........... | 252/332 |
| 4,284,433 A | 8/1981 | Aignesberger et al. | |
| 4,506,734 A | 3/1985 | Nolte | |
| 4,643,362 A | 2/1987 | Serafin ........................ | 241/16 |
| 4,711,401 A | 12/1987 | Serafin ........................ | 241/16 |
| 4,741,401 A | 5/1988 | Walles et al. ............... | 166/300 |
| 4,770,796 A | 9/1988 | Jacobs | |
| 4,961,790 A | 10/1990 | Smith et al. ................. | 106/823 |
| 5,151,203 A * | 9/1992 | Riley et al. .................. | 106/606 |
| 5,203,629 A | 4/1993 | Valle et al. .................... | 366/2 |
| 5,236,501 A | 8/1993 | Nomachi et al. ........... | 106/723 |
| 5,253,991 A | 10/1993 | Yokota et al. .................. | 425/6 |
| 5,292,512 A | 3/1994 | Schaefer et al. ............. | 424/401 |
| 5,320,851 A | 6/1994 | de Mars et al. ............. | 424/451 |
| 5,358,047 A | 10/1994 | Himes et al. | |
| 5,551,976 A * | 9/1996 | Allen ........................ | 588/250 |
| 5,603,961 A | 2/1997 | Suzuki et al. ............... | 424/502 |
| 5,728,209 A | 3/1998 | Bury et al. .................. | 106/819 |
| 5,766,323 A | 6/1998 | Butler et al. .................... | 106/2 |
| 5,795,060 A * | 8/1998 | Stephens ........................ | 366/2 |
| 6,027,561 A | 2/2000 | Gruber et al. ............... | 106/718 |
| 6,170,575 B1 | 1/2001 | Reddy et al. ............... | 166/293 |
| 6,245,142 B1 | 6/2001 | Reddy et al. ............... | 106/724 |
| 6,379,456 B1 | 4/2002 | Heathman et al. .......... | 106/724 |
| 6,457,524 B1 | 10/2002 | Roddy ........................ | 166/293 |
| 6,471,975 B1 | 10/2002 | Banovetz et al. ........... | 424/408 |
| 6,478,869 B1 | 11/2002 | Reddy et al. ............... | 106/724 |
| 6,494,951 B1 | 12/2002 | Reddy et al. ............... | 106/705 |
| 6,508,305 B1 | 1/2003 | Brannon et al. ............ | 166/293 |
| 6,599,863 B1 | 7/2003 | Palmer et al. ............... | 507/219 |
| 6,610,139 B1 | 8/2003 | Reddy et al. ............... | 106/724 |
| 6,632,527 B1 | 10/2003 | McDaniel et al. .......... | 428/402 |
| 6,645,288 B1 | 11/2003 | Dargaud et al. ............ | 106/696 |
| 6,648,962 B1 | 11/2003 | Berke et al. ................ | 106/696 |
| 6,660,080 B1 | 12/2003 | Reddy et al. ............... | 106/724 |
| 6,689,208 B1 | 2/2004 | Brothers ..................... | 106/794 |
| 2002/0004464 A1 | 1/2002 | Nelson et al. .............. | 507/200 |
| 2002/0193257 A1 | 12/2002 | Lee et al. .................... | 507/200 |
| 2003/0089281 A1 | 5/2003 | Berke et al. | |
| 2003/0134751 A1 | 7/2003 | Lee et al. .................... | 507/200 |
| 2003/0234103 A1 | 12/2003 | Lee et al. .................... | 166/293 |

FOREIGN PATENT DOCUMENTS

| | | |
|---|---|---|
| WO | WO 97/05079 | 2/1997 |
| WO | WO 00/49272 | 8/2000 |
| WO | WO 2004/001188 A1 | 12/2003 |

OTHER PUBLICATIONS

Foreign communication from a related counterpart application dated Jul. 5, 2005.
Paper entitled "Cementing" by Dwight K. Smith, dated 1990.

* cited by examiner

*Primary Examiner*—George Suchfield
(74) *Attorney, Agent, or Firm*—Craig W. Roddy; Baker Botts L.L.P.

(57) ABSTRACT

The present invention relates to substantially hydrated cement particulates. More particularly, the present invention relates to compositions comprising substantially hydrated cement particulates and associated methods of use in drilling and subterranean applications. These substantially hydrated cement particulates may be included in drilling and subterranean treatment fluids, inter alia, as carrier particles for admixtures, lost circulation materials, density-varying additives, proppants, and the like.

11 Claims, No Drawings

USE OF SUBSTANTIALLY HYDRATED CEMENT PARTICULATES IN DRILLING AND SUBTERRANEAN APPLICATIONS

BACKGROUND OF THE INVENTION

The present invention relates to substantially hydrated cement particulates. More particularly, the present invention relates to compositions comprising substantially hydrated cement particulates and associated methods of use in drilling and subterranean applications.

Hydraulic cement compositions are commonly utilized in surface and subterranean operations, particularly subterranean well completion and remedial operations. For example, hydraulic cement compositions are used in primary cementing operations whereby pipe strings such as casings and liners are cemented into well bores. In performing primary cementing, hydraulic cement compositions are pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surface of the pipe string to the walls of the well bore.

To modify one or more properties of a cement composition (or of the resultant set cement), various admixtures may be included in the cement composition. As used herein, the term "admixture" refers to materials, other than cement and water used for making cement compositions, which may added to the cement compositions or other subterranean treatment fluids before or during its mixing. Admixtures oftentimes are provided in the form of liquids or soluble solids (e.g., powders). Attempts have been made to counteract the problems that may be associated with the delivery of admixtures in solid and liquid form. For instance, an admixture provided in powdered form may become dry compacted, or the admixture, in another instance, may be coated onto a carrier particle. However, improvements are needed for the delivery of admixtures into cement compositions and subterranean treatment fluids.

In addition, other additives such as lost circulation materials, lightweight additives, heavyweight additives, proppants, and the like are often added to cement compositions and subterranean treatment fluids. However, improvements are needed in the additives that may be included in cement compositions and subterranean treatment fluids, including, inter alia, drilling fluids, completion fluids, and workover fluids.

SUMMARY OF THE INVENTION

The present invention relates to substantially hydrated cement particulates. More particularly, the present invention relates to compositions comprising substantially hydrated cement particulates and associated methods of use in drilling and subterranean applications.

In some embodiments, the present invention provides a method of using a subterranean treatment fluid in a subterranean formation comprising: providing a subterranean treatment fluid comprising substantially hydrated cement particulates; and placing the subterranean treatment fluid into a subterranean formation.

In another embodiment, the present invention provides a method of cementing in a subterranean formation comprising: providing a cement composition comprising water, a hydraulic cement, and substantially hydrated cement particulates; placing the cement composition into a subterranean formation; and allowing the cement composition to set therein.

In another embodiment, the present invention provides a method of reducing fluid loss from a cement composition comprising adding substantially hydrated cement particulates to the cement composition.

In another embodiment, the present invention provides a method of affecting the density of a cement composition comprising adding substantially hydrated cement particulates to the cement composition.

In another embodiment, the present invention provides a subterranean treatment fluid comprising substantially hydrated cement particulates.

In another embodiment, the present invention provides a lost circulation composition comprising substantially hydrated cement particulates.

In yet another embodiment, the present invention provides a density-varying additive comprising substantially hydrated cement particulates.

The features and advantages of the present invention will be readily apparent to those skilled in the art upon a reading of the description of the exemplary embodiments, which follows.

DESCRIPTION OF EXEMPLARY EMBODIMENTS

The present invention relates to substantially hydrated cement particulates. More particularly, the present invention relates to compositions comprising substantially hydrated cement particulates and associated methods of use in drilling and subterranean applications. While the substantially hydrated cement particulates of the present invention are useful in a variety of applications, they may be particularly useful when included in subterranean treatment fluids and drilling fluids, inter alia, as carrier particles for admixtures, lost circulation materials, density-varying additives, proppants, and the like.

The cement compositions of the present invention generally comprise water, hydraulic cement, and substantially hydrated cement particulates. Typically, the cement compositions of the present invention may have a density in the range of from about 4 lb/gallon to about 20 lb/gallon. In certain exemplary embodiments, the cement compositions of the present invention may have a density in the range of from about 8 lb/gallon to about 17 lb/gallon. The cement compositions of the present invention may be foamed or unfoamed or may comprise other means to vary their densities. One of ordinary skill in the art, with the benefit of this disclosure, will recognize the appropriate density of the cement composition for a chosen application.

The water utilized in the cement compositions of the present invention can be fresh water, salt water (e.g., water containing one or more salts dissolved therein), brine (e.g., saturated salt water), or seawater. Generally, the water can be from any source, provided that it does not adversely affect other components in the cement composition. The water may be present in an amount sufficient to form a pumpable slurry. In certain exemplary embodiments, the water is present in the cement compositions of the present invention in an amount in the range of from about 30% to about 180% by weight of the hydraulic cement.

Generally, any hydraulic cement suitable for use in cementing operations may be suitable for use in the present invention. A variety of hydraulic cements are suitable for use, including those comprised of calcium, aluminum, silicon, oxygen, and/or sulfur, which set and harden by reaction with water. Such hydraulic cements include, but are not limited to, Portland cements, pozzolanic cements, gypsum cements, soil cements, calcium phosphate cements, high-alumina content cements, silica cements, high-alkalinity cements, or mixtures thereof.

The cement compositions of the present invention further comprise substantially hydrated cement particulates. In certain embodiments, the substantially hydrated cement particulates may be used as carrier particles for chosen admixtures. In another embodiment, the substantially hydrated cement particulates may be added to cement compositions as lost circulation materials in order, inter alia, to bridge and/or plug fractures and permeable zones in the formation so as to minimize the fluid loss from the cement compositions into the formation. In yet another embodiment, the substantially hydrated cement particulates may be added to the cement compositions to affect the density of the cement compositions, for example, as lightweight additives or heavyweight additives.

The substantially hydrated cement particulates may be formed in any suitable manner. In certain embodiments of the present invention, the substantially hydrated cement particulates present in the cement compositions of the present invention are formed by providing a settable composition comprising a hydraulic cementitious material and water; allowing the settable composition to set into a substantially hydrated mass; and comminuting the substantially hydrated mass into smaller particles so as to form the substantially hydrated cement particulates used in the methods of the present invention. In another embodiment, the settable composition further may comprise at least one admixture so that the substantially hydrated cement particulates also comprise at least one admixture. In yet another embodiment, after comminution of the substantially hydrated mass into the substantially hydrated cement particulates, the substantially hydrated cement particulates may be coated with at least one admixture. This permits the combination of admixtures that may not be compatible when used in solution. An exemplary method for producing the substantially hydrated cement particulates and/or intermixing the admixtures therein is described in U.S. Pat. No. 6,648,962, which is incorporated herein by reference.

The settable compositions used to form the substantially hydrated cement particulates of the present invention typically may have a density in the range of from about 4 lb/gallon to about 20 lb/gallon. The settable compositions of the present invention may be foamed or unfoamed or may comprise other means to vary their densities. One of ordinary skill in the art, with the benefit of this disclosure, will recognize the appropriate density of the settable composition for a chosen application.

Generally, the hydraulic cementitious material used to form the substantially hydrated cement particulates of the present invention may be any hydraulic cementitious material that is suitable for use in cementing operations. A variety of hydraulic cementitious materials are suitable for use, including those comprised of calcium, aluminum, silicon, oxygen, and/or sulfur, which set and harden by reaction with water. Such hydraulic cementitious materials include, but are not limited to, Portland cements, pozzolanic cements, gypsum cements, soil cements, calcium phosphate cements, high-alumina content cements, silica cements, high-alkalinity cements, slag cements, or mixtures thereof.

The water utilized to from the substantially hydrated cement particulates of the present invention can be fresh water, salt water (e.g., water containing one or more salts dissolved therein), brine (e.g., saturated salt water), or seawater. Generally, the water can be from any source, provided that it does not adversely affect other components in the settable composition. The water may be present in an amount sufficient to form a pumpable slurry. In certain exemplary embodiments, the water is present in the settable compositions of the present invention in an amount in the range of from about 30% to about 180% by weight of the hydraulic cementitious material. In certain embodiments, the water may be added to the hydraulic cementitious material, admixture(s), or both. In another embodiment, the water may be incorporated in an aqueous dispersion, emulsion, or solution containing the admixture(s).

Comminution of the substantially hydrated mass to form the substantially hydrated cement particulates may be accomplished by any of a variety of suitable methods. For example, comminution may be achieved by subjecting the substantially hydrated mass to compressive or grinding forces, such as by using a jaw crusher, a roller crusher (e.g., opposed steel rollers), a ball mill, a disk mill, or a grinder. After comminution, the substantially hydrated cement particulates may be highly granulate with a high surface area, thereby providing a high loading surface.

The size of the substantially hydrated cement particulates may vary based upon the desired application. In certain embodiments, the substantially hydrated cement particulates may have an average diameter in the range of from about 5 to about 250 micrometers. However, it should be understood that in other embodiments of the present invention the substantially hydrated cement particulates may have an average diameter of greater than about 250 micrometers or of less that about 5 micrometers as desired. One of ordinary skill in the art with the benefit of this disclosure will know the appropriate size of particulates for a particular application.

In certain embodiments of the present invention, the settable compositions used to form the substantially hydrated cement particulates of the present invention further may comprise at least one admixture so that the substantially hydrated cement particulates also comprise at least one admixture. Among other things, this provides for the delivery of admixture(s) into a cement composition, for example, when the substantially hydrated cement particulates comprising at least one admixture are added to a cement composition. The admixture(s) may be provided as soluble solids (e.g., powders) or liquids. Any admixture commonly used in subterranean cementing operations may be included in the settable compositions of the present invention. A wide variety of admixtures may be included in the settable compositions, including, but not limited to, accelerators, retarders, fluid loss control additives, filtration-control additives, dispersants, surfactants, salts, defoamers, formation conditioning agents, expanding additives, flow enhancing additives, strength enhancing additives, water reducers, pumping aids, and the like. One skilled in the art with the benefit of this disclosure will know the type of admixture to include for a particular application.

In certain embodiments of the present invention, after comminution of the substantially hydrated mass into the substantially hydrated cement particulates, the substantially hydrated cement particulates may be coated with at least one admixture. The substantially hydrated cement particulates that are coated with at least one admixture may comprise at least one admixture. The coating of the admixture(s) onto the substantially hydrated cement particulates may be applied using any suitable coating method.

The amount of admixture or admixtures to include in the settable compositions, coat onto the substantially hydrated cement particulates, or both, should depend, inter alia, on the desired amount of the admixture(s) to incorporate into the cement composition. The desired amount of the admixture(s) to incorporate into the cement composition may depend, inter alia, on the type of admixture(s) employed. Generally, the admixture(s) may be included in the settable composition in an admixture(s)-to-hydraulic cementitious material weight ratio in the range of from about 5:95 to about 95:5. One of ordinary skill in the art with the benefit of this disclosure will know the appropriate amount of the admixture(s) to include in the settable composition for a particular application.

Among other things, the methods of the present invention may provide for the accurate measurement of the amount of the admixture(s) added to cement compositions as well as avoiding time-consuming labor, energy costs, and processing complexity that may be associated with conventional methods for the delivery of admixtures into cement compositions. An accurate measurement of the amount of admixture(s) in the cement composition may be obtained whether the admixture(s) is added to a settable composition, coated onto the substantially hydrated cement particulates, or both. For example, the amount of the admixture(s) introduced into the cement composition may be obtained by measuring the bulk weight of the substantially hydrated cement particulates and the relative amount of admixtures.

In certain embodiments of the present invention, the substantially hydrated cement particulates may be added to cement compositions as density-varying additives (e.g., lightweight additives or heavyweight additives) to affect the density of the cement compositions. By varying the density of the settable compositions used to form the substantially hydrated cement particles, the density of the resultant substantially hydrated cement particles may be varied. The settable compositions, as previously discussed, may have a density in the range of from about 4 lb/gallon to about 20 lb/gallon. In some embodiments of the present invention, the substantially hydrated cement particulates may be added to cement compositions as lightweight additives. Lightweight additives generally may be added to cement compositions to reduce the density thereof. When desired to use the substantially hydrated cement particulates as lightweight additives in cement compositions, settable compositions with relatively low densities as compared to the cement compositions may be used to form the substantially hydrated cement particles. In another embodiment of the present invention, the substantially hydrated cement particulates may be added to cement compositions as heavyweight additives. Heavyweight additives generally may be added to cement compositions to increase the density thereof. When desired to use the substantially hydrated cement particulates as heavyweight additives, settable compositions with relatively high densities as compared to the cement compositions may be used to form the substantially hydrated cement particles. Where used to affect the density of cement compositions, the substantially hydrated cement particulates should be included in the cement compositions in an amount sufficient to provide the desired density modification.

In certain embodiments, the substantially hydrated cement particulates may be added to cement compositions as lost circulation materials. In one embodiment, where added to the cement composition as a lost circulation material, the substantially hydrated cement particulates are present in the cement composition in an amount in the range of from about 1% to about 50% by weight of the hydraulic cement. In another embodiment, where added to the cement composition as a lost circulation material, the substantially hydrated cement particulates are present in the cement composition in an amount in the range of from about 5% to about 10% by weight of the hydraulic cement.

Furthermore, additional additives may be added to the cement compositions of the present invention as deemed appropriate by one skilled in the art. Examples of such additives include, but are not limited to, fly ash, silica compounds, fluid loss control additives, lost circulation materials, surfactants, dispersants, accelerators, retarders, lightweight additives (e.g., microspheres), salts, mica, fibers, formation conditioning agents, fumed silica, bentonite, expanding additives, heavyweight additives, defoamers, and the like.

While the exemplary embodiments of the present invention depicted above describe the use of substantially hydrated cement particulates in cement compositions, it should be understood that the substantially hydrated cement particulates of the present invention may be included in a variety of subterranean treatment fluids to improve one or more properties thereof. For example, the substantially hydrated cement particulates may be included in subterranean treatment fluids, inter alia, as carrier particles for admixtures, lost circulation materials, density-varying additives, or proppants. Where used as a proppant, the substantially hydrated cement particulate should consist essentially of hydrated cement. Examples of particular subterranean treatment fluids where the substantially hydrated cement particles may be used include, but are not limited to, drilling fluids, completion fluids, and workover fluids. One of ordinary skill in the art with the benefit of this application will know the appropriate amount and particle size of substantially hydrated cement particulates to include in a subterranean treatment fluid for a desired application.

In some embodiments, the present invention provides a method of using a subterranean treatment fluid in a subterranean formation comprising: providing a subterranean treatment fluid comprising substantially hydrated cement particulates; and placing the subterranean treatment fluid into a subterranean formation.

In another embodiment, the present invention provides a method of cementing in a subterranean formation comprising: providing a cement composition comprising water, a hydraulic cement, and substantially hydrated cement particulates; placing the cement composition into a subterranean formation; and allowing the cement composition to set therein.

In another embodiment, the present invention provides a method of reducing fluid loss from a cement composition comprising adding substantially hydrated cement particulates to the cement composition.

In another embodiment, the present invention provides a method of affecting the density of a cement composition comprising adding substantially hydrated cement particulates to the cement composition.

In another embodiment, the present invention provides a subterranean treatment fluid comprising substantially hydrated cement particulates.

In another embodiment, the present invention provides a lost circulation composition comprising substantially hydrated cement particulates.

In yet another embodiment, the present invention provides a density-varying additive comprising substantially hydrated cement particulates.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of using drilling fluid for drilling in a subterranean formation comprising the steps of:
   providing a drilling fluid comprising substantially hydrated cement particulates; and
   placing the drilling fluid into the subterranean formation during the drilling.

2. The method of claim 1 wherein the substantially hydrated cement particulates comprise an admixture.

3. The method of claim 1 wherein the substantially hydrated cement particulates are formed by providing a settable composition comprising a hydraulic cementitious material, and water; allowing the settable composition to set into a substantially hydrated mass; and comminuting the substantially hydrated mass into smaller particles so as to form the substantially hydrated cement particulates.

4. The method of claim 3 wherein the hydraulic cementitious material is selected from the group consisting of a Portland cement, a pozzolanic cement, a gypsum cement, a soil cement, a calcium phosphate cement, a high-alumina content cement, a silica cement, a high-alkalinity cement, a slag cement, and mixtures thereof.

5. The method of claim 3 wherein the settable composition further comprises an admixture so that the substantially hydrated cement particulate comprises an admixture.

6. The method of claim 5 wherein the admixture is present in the settable composition in an admixture-to-hydraulic cementitious material weight ratio in the range of from about 5:95 to about 95:5.

7. The method of claim 5 further comprising the step of coating the substantially hydrated cement particulates with another admixture.

8. The method of claim 3 further comprising the step of coating the substantially hydrated cement particulates with an admixture.

9. The method of claim 1 wherein the substantially hydrated cement particulates have an average particle diameter in the range of from about 5 micrometers to about 250 micrometers.

10. The method of claim 1 wherein the hydrated cement particulates are a lost circulation material or a density-varying additive.

11. The method of claim 1 wherein the substantially hydrated cement particulates comprise a hydraulic cementitious material selected from the group consisting of a Portland cement, a pozzolanic cement, a gypsum cement, a soil cement, a calcium phosphate cement, a high-alumina content cement, a silica cement, a high-alkalinity cement, a slag cement, and mixtures thereof.

* * * * *